United States Patent
Säilä et al.

(10) Patent No.: US 9,918,534 B2
(45) Date of Patent: Mar. 20, 2018

(54) COVER FOR AN ELECTRONIC DEVICE

(71) Applicant: Microsoft Technology Licensing, LLC, Redmond, WA (US)

(72) Inventors: Sami Säilä, Halikko (FI); Jose M. Perez, Helsinki (FI)

(73) Assignee: Microsoft Technology Licensing, LLC, Redmond, WA (US)

(*) Notice: Subject to any disclaimer, the term of this patent is extended or adjusted under 35 U.S.C. 154(b) by 32 days.

(21) Appl. No.: 15/084,466

(22) Filed: Mar. 29, 2016

(65) Prior Publication Data
US 2017/0280842 A1    Oct. 5, 2017

(51) Int. Cl.
| A45C 11/00 | (2006.01) |
| A45C 13/10 | (2006.01) |
| A45F 5/00 | (2006.01) |
| G06F 1/16 | (2006.01) |

(52) U.S. Cl.
CPC .......... *A45C 11/00* (2013.01); *A45C 13/1069* (2013.01); *A45F 5/00* (2013.01); *G06F 1/1626* (2013.01); *A45C 2011/001* (2013.01); *A45C 2011/002* (2013.01); *A45C 2011/003* (2013.01); *A45C 2200/15* (2013.01); *G06F 2200/1633* (2013.01); *G06F 2200/1634* (2013.01)

(58) Field of Classification Search
CPC ............... A45C 11/00; A45C 13/1069; A45C 2011/001; A45C 2011/002; A45C 2011/003; A45C 2200/15; A45F 5/00
USPC ..... 206/305, 320, 45.2–45.23; 248/361, 152, 248/174, 459
See application file for complete search history.

(56) References Cited

U.S. PATENT DOCUMENTS 3,305,205 A * 2/1967 Frankl .................... A47G 1/141
206/45.2
3,410,516 A * 11/1968 Criswell ................ A47B 23/04
248/459

(Continued)

FOREIGN PATENT DOCUMENTS

| CN | 103237276 A | 8/2013 |
| GB | 2500947 A | 10/2013 |

OTHER PUBLICATIONS

Purcher Jack, "Samsung Granted a Design Patent for an Interesting New Tablet", Published on: Jan. 6, 2015, 4 pages, Available at: http://www.patentlymobile.com/2015/01/samsung-granted-a-design-patent-for-an-interesting-new-tablet.html.

(Continued)

*Primary Examiner* — Chun Cheung (57) ABSTRACT

A cover for an electronic device comprises a back sheet portion comprising a first section and a second section and a front sheet portion comprising a first section and a second section. The second end of the front sheet portion is connected to the second section of the back sheet portion, and the first end of the front sheet portion is connected to the first section of the back sheet portion at a distance of the first end of the back sheet portion, the cover having an end section. The cover is foldable between a cover position and a support position. In the cover position, the back sheet portion and the front sheet portion are substantially planar and resting against each other. In the support position, at least a part of the end section rests against at least a part of the first section of the front sheet portion.

20 Claims, 4 Drawing Sheets

(56) References Cited

U.S. PATENT DOCUMENTS

| | | | | |
|---|---|---|---|---|
| 3,690,620 | A * | 9/1972 | Matson | E01F 9/654 248/459 |
| 4,607,817 | A * | 8/1986 | Aquino | A47B 23/044 206/214 |
| 8,282,065 | B1 * | 10/2012 | Stone | A47B 23/044 16/221 |
| 8,312,991 | B2 | 11/2012 | Diebel et al. | |
| 8,474,609 | B1 * | 7/2013 | Hong | A45C 11/00 206/320 |
| 8,714,351 | B2 * | 5/2014 | Toulotte | A45C 11/00 206/320 |
| 8,884,730 | B2 * | 11/2014 | Lauder | H01F 7/04 206/320 |
| 8,960,421 | B1 | 2/2015 | Diebel | |
| 2004/0240164 | A1 * | 12/2004 | Lee | G06F 1/1616 361/679.55 |
| 2013/0020215 | A1 | 1/2013 | Hsu | |
| 2013/0114198 | A1 | 5/2013 | Gengler | |
| 2013/0140203 | A1 | 6/2013 | Chiang | |
| 2013/0241381 | A1 | 9/2013 | Hynecek et al. | |
| 2014/0061071 | A1 | 3/2014 | Kim | |
| 2014/0063715 | A1 | 3/2014 | Hwang | |
| 2014/0247548 | A1 | 9/2014 | Sharma et al. | |
| 2014/0262853 | A1 * | 9/2014 | DeChant | G06F 1/1628 206/45.2 |
| 2015/0296946 | A1 | 10/2015 | Buechin | |
| 2015/0365123 | A1 * | 12/2015 | Kim | A47B 23/043 455/575.8 |
| 2015/0372708 | A1 | 12/2015 | Chiou | |

OTHER PUBLICATIONS

Martin, Jim, "Best iPad Cases and Covers: Protect Your Ipad in Style with Stand Cases, Folios, Sleeves and More", Published on: Jul. 2, 2015, 7 pages, Available at: http://www.pcadvisor.co.uk/test-centre/apple/best-ipad-cases-covers-3345046/.

"International Search Report and Written Opinion Issued in PCT Application No. PCT/US2017/023702", dated Jun. 27, 2017, 13 Pages.

* cited by examiner

COVER FOR AN ELECTRONIC DEVICE

BACKGROUND

Covers are available for various electronic devices, such as portable or mobile devices which may comprise a display, to protectively cover at least a part of the device, such as the display or the entire body of the device. Some covers may be divided into rigid sections that may be folded to form a shape, such that the device may rest against or hang on the folded cover, for instance when hung over the headrest of a car. Covers may be pivoted about an attachment, for instance a magnetic attachment, to the device.

The design and structure of the cover may affect the stability of the folded cover and the angle at which an electronic device may rest against or be otherwise attached to the folded cover.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A cover for an electronic device is disclosed. The cover may comprise a back sheet portion having a first end and a second end, the back sheet portion comprising a first section extending from the first end and a second section, the first section of the back sheet portion being hingedly connected to the second section of the back sheet portion. The cover may comprise a front sheet portion having a first end and a second end, the front sheet portion comprising a first section extending from the first end and a second section, the first section of the front sheet portion being hingedly connected to the second section of the front sheet portion. The second end of the front sheet portion may be connectable or connected to the second section of the back sheet portion, and the first section of the front sheet portion may be hingedly connectable or connected to the first section of the back sheet portion at a distance of the first end of the back sheet portion, the cover thereby having an end section extending the distance from the first end of the back sheet portion along the first section of the back sheet portion. The cover may be foldable between a cover position and a support position, wherein in the cover position, the back sheet portion and the front sheet portion are substantially planar and resting against each other, and in the support position, at least a part of the end section rests against at least a part of the first section of the front sheet portion.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

In FIGS. 1 to 4, the covers and the device assembly are illustrated as schematic drawings. The drawings may not be in scale.

DETAILED DESCRIPTION

The detailed description provided below in connection with the appended drawings is intended as a description of a number of embodiments and is not intended to represent the only forms in which the embodiments may be constructed, implemented, or utilized.

Figure 1A:
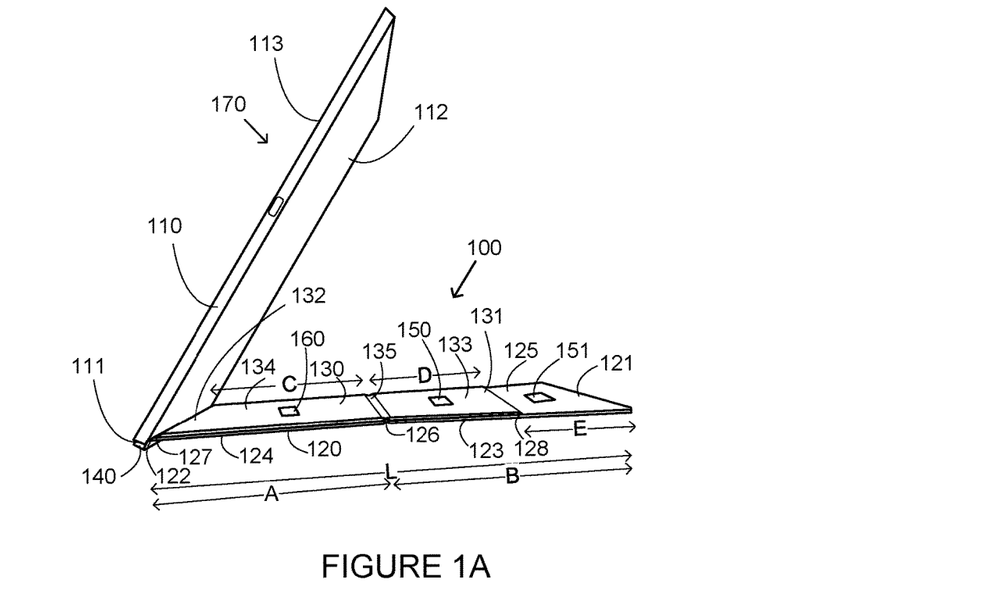
FIGS. 1A, 1B and 1C illustrate alternative views and details of an embodiment of a cover for an electronic device and a device assembly.
Figure 1B:
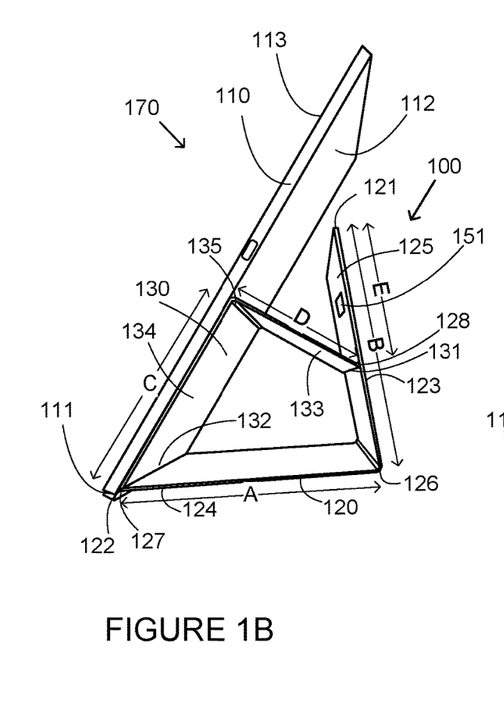
Figure 1C:
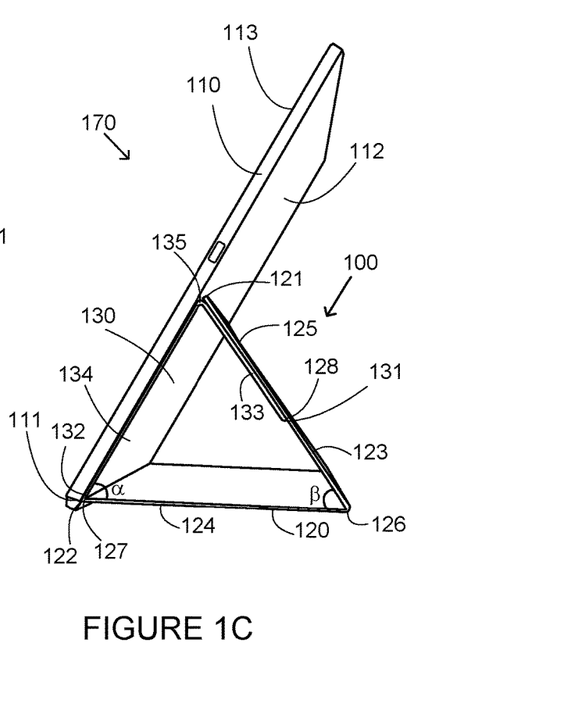

The cover 100 of FIG. 1 is shown as a side view. The cover may be called a protective cover or a support cover. It is depicted in FIG. 1 as a part of a device assembly 170 comprising an electronic device 110 having a substantially planar configuration and having an edge 111 and two opposite sides 112 and 113. In this exemplary embodiment, the electronic device 110 is rectangular, i.e. the sides 112 and 113, are rectangular, but the device 110 and the sides 112 and 113 may also be otherwise shaped, for example, triangle shaped or round. However, the electronic device 110 is included in FIG. 1 for illustrative purposes and it should be understood that the cover 100 does not have to be connected to an electronic device. The electronic device 110 may be, for instance, a tablet computer, a smartphone or a mobile phone, a phablet, a media player, a personal digital assistant, an e-book reader, a game console, a wearable device, a display or a flat-screen television. The electronic device 110 may have a touchscreen or another type of display disposed on the side 113, not being visible in the FIGs, the side 112 thus being the back side. A touch sensitive area may, in other embodiments of the device 110, be disposed on the opposite side 112, while the display is disposed on the side 113.

The cover 100 comprises a back sheet portion 120 having a first end 121 and a second end 122. The back sheet portion 120 comprises a first section 123 extending from the first end 121 and a second section 124 extending from the second end 122. The first section 123 and the second section 124 are hingedly connected via a hinge region 126. The "hinge region" may refer to any structure providing hinged movement between the sections about an axis; the axis may be perpendicular to the length of the sheet portions from the first end to the second end. The hinge region 126 may be a region of the sheet portion that is more easily foldable than other parts of the sheet portion. The hinge region 126 may be any type of hinge region, for instance a live hinge. The "live hinge" may refer to a hinge region formed at the joint of two sections of the same piece of material that is made of the same material as the two sections it joins and which provides hinged movement by flexure or bending of the material along a thinned or weakened area. Such a live hinge may be provided e.g. by thinning or weakening the material of the sheet portion between the two sections so that the sections may be hingedly folded with respect to each other.

The cover 100 further comprises a front sheet portion 130 having a first end 131 and a second end 132. The front sheet portion 130 comprises a first section 133 extending from the first end 131 and a second section 134, the second section 134 being hingedly connected to the first section 133 via a hinge region 135 such that the first and second sections 133 and 134 may be folded with respect to each other along the hinge region 135.

It should be understood that the terms "back sheet portion" and "front sheet portion" are not intended to indicate that they are specifically configured to cover the back side of an electronic device and the front side of an electronic device, respectively. The back sheet portion may be configured to cover the back side or the front side of an electronic device, and the front sheet portion may be configured to cover the back side or the front side of the electronic device, when in use.

The back sheet portion 120 and the front sheet portion 130 may be formed of two separate sheet portions, or they may be integral parts of the cover formed as one single body e.g. by folding a single sheet into two portions. Upon folding the sheet into two, a hinge region 127 may be formed between the back sheet portion and the front sheet portion. In an embodiment, the hinge region 127 may be formed between separate sheet portions by attaching them using a suitable structure.

The cover 100, when in use, may be folded or set between a cover position and a support position. FIG. 1A shows the cover in the cover position, wherein the front sheet portion 130 and the back sheet portion 120 are substantially planar and parallel, thereby resting against each other.

In this exemplary embodiment, the second end 132 of the front sheet portion 130 is hingedly connected to the second end 122 of the back sheet portion 120 via the hinge region 127. The first end 131 of the front sheet portion 130 is hingedly connected to the first section 123 of the back sheet portion 120 via a hinge region 128 at a distance E from the first end 121 of the back sheet portion 120. The hinge region 128 may be formed between the sheet portions by attaching them using a suitable structure. The cover thus has an end section 125 that extends from the first end 121 of the back sheet portion 120 along the first section of the back sheet portion to the first end 131 of the front sheet portion 130. The first end 131 of the front sheet portion 130 may be connected to the first section 123 of the back sheet portion 120 in any suitable manner, e.g. by laminating, using an adhesive or using a mechanical connecting structure.

The main material of the cover or the main material of the back sheet portion 120 and the front sheet portion 130 may be any suitable material, including e.g. polyethylene (PE), polyurethane (PU), or other plastic material; a fabric, such as microfiber; leather; or cardboard; or any combination of two or more of any of these materials. In an embodiment, the material may be any material that may be bonded. In another embodiment, the first and/or second sections of the back sheet portion and/or the front sheet portion may be formed of or comprise a rigid sheet. The rigid sheet may be made mainly of a suitably rigid material, e.g. glass fiber; a metal, such as steel; a ferromagnetic metal; polystyrene (PS); carbon fiber reinforced composite; or cardboard. The rigid sheet(s) may be enclosed by a surface material, such as polyethylene (PE), polyurethane (PU), or other plastic material, a fabric, such as microfiber, or leather.

The sheet portions and sections of the cover 100 may be e.g. 0.3 to 2 mm thick, but they may also be thinner or thicker, depending on the material, the dimensions of the cover and other factors. Relatively thick portions and sections, such as those being about 1.5 to 2 mm thick or thicker, may be shock absorbing and thereby be well suited to protect the electronic device.

The first and second sections of the back sheet portion 120 and the front sheet portion 130 may be rigid. It is, however, not necessary for all of the sections of the cover to be rigid. For instance, in an embodiment, the second section 124 of the back sheet portion 120 may be flexible. In another embodiment, the first section 133 of the front sheet portion 130 may be flexible. Such flexible sections may be made of any suitably flexible material, e.g. a fabric or a suitable plastic. In an embodiment, the second section 134 of the front sheet portion 130 and the first section 123 of the back sheet portion 120 are rigid.

The cover may comprise an attaching arrangement comprising an attachment 150 in the first section 133 of the front sheet portion 130. The attaching arrangement may further comprise an attachment 151 in the end section 125. The cover may further comprise a second attaching arrangement comprising an attachment 160 in the second section 134 of the front sheet portion 130.

Any one of the attachments 150, 151 and 160 may comprise, for example, a magnet, a mechanical stopper, an adhesive, a touch fastener (e.g. a hook-and-loop fastener), or a press fastener (also known as snap fastener or snap), but other suitable attaching arrangements or attachments may also be contemplated. In embodiments in which the attaching arrangement or attachment comprises a magnet, i.e. is a magnetic attaching arrangement, or another type of attaching arrangement that does not require direct contact but may exert a force from a distance, the attachment 150 may be embedded in the first section 133 of the front sheet portion such that it is not visible, for instance by disposing the attachment under the surface material of the cover. In a similar manner as the attachment 150, the attachments 151 and 160 may independently be embedded in the end section 125 or in the second section 134 of the front sheet portion and may therefore not be visible.

Depending on the type of the attachments 150 and 160 and the material of the back sheet portion 120, for instance, when the attachment 150 and/or 160 comprises a magnet and the back sheet portion 120 comprises a ferromagnetic metal, the attachment 150 and/or the attachment 160 in the second section 134 of the front sheet portion 130 may exert a force on the ferromagnetic metal comprised in the back sheet portion 120 and thereby releasably retain the front sheet portion 130 against the back sheet portion 120 when the cover 100 is in the cover position.

The cover 100 may be pivotally turnable about the connecting member 140 and the edge 111 of the electronic device 110 such that it may cover at least a part of either one of the opposite sides 112 or 113 of the electronic device 110. In an embodiment, the cover 110 may be a flip-type cover.

The cover 100 may be connected or connectable, for instance pivotally or hingedly, to the edge 111 of the electronic device 110 via a connecting member 140. The cover 100 may be considered to be in a cover position also if the cover 100 is turned pivotally about the edge 111 so that it rests against one of the opposite sides 112 or 113 of the electronic device 110. The connecting member 140 may be attached to the electronic device 110 irremovably or releasably. The connecting member 140 may be flexible and/or resilient. The connecting member 140 may comprise an attaching arrangement or attachment, e.g. a magnet, a mechanical structure or an adhesive, however, various other types of attaching arrangements configured to attach the cover to the electronic device may be contemplated. For instance, the connecting member 140 may comprise any type of attaching arrangement or attachment described in this specification. In an embodiment, the device assembly 170 or the cover 100 may comprise a cradle (not shown). In such an embodiment, the cover 100 may be attached to the electronic device 110 via the cradle, the cradle forming a support part configured to lie against a side of the electronic device.

The cover 100 may be foldable between a plurality of open positions, so that when in use, it may be folded or set between a cover position and a plurality of open positions. FIG. 1B illustrates the cover of FIG. 1A in an open position, according to an embodiment. In the open position, the back sheet portion 120 and the front sheet portion 130 are non-planar, and the back sheet portion 120 and the front sheet portion 130 are at least partially separated from each other by a distance. The second section 124 of the back sheet portion 120 does not rest against the second section 134 of the front sheet portion 130. In this open position, a part of the first section 123 and the second section 124 of the back sheet portion 120 together with the first section 133 and the second section 134 of the front sheet portion 130 form a hollow structure having a quadrilateral cross-section when viewed from the side.

FIG. 1C illustrates the same cover 100 in a support position, according to an embodiment. The support position may also be considered to be an open position. In the support position, the back sheet portion 120 and the front sheet portion 130 are non-planar, and the back sheet portion 120 and the front sheet portion 130 are at least partially separated from each other by a distance. The second section 124 of the back sheet portion 120 does not rest against the second section 134 of the front sheet portion 130. At least a part of the end section 125 rests on or against at least a part of the first section 133 of the front sheet portion 130. In this embodiment, the end section 125 consists of a part of the first section 123 of the back sheet portion 120, the part of the first section 123 of the back sheet portion 120 thereby resting directly against the first section 133 of the front sheet portion 130. The first section 123 of the back sheet portion 120 and the first section 133 of the front sheet portion 130 are parallel in the support position. In the support position, a part of the first section 123 and the second section 124 of the back sheet portion 120 together with the first section 133 and the second section 134 of the front sheet portion 130 form a hollow structure having a triangular cross-section when viewed from the side. The second section 124 of the back sheet portion 120 may be arranged to rest on or against a support plane, such as a table top. Further, the first section 123 of the back sheet portion 120 may be arranged to rest on or against a support plane, such as a table top. In such a position, the edge opposite to the edge 111 of the electronic device 110 may be arranged to rest on or against the support plane. Further, the cover may be hung over the headrest of a car when in use in the support position, e.g. so that the second section 124 or the first section 123 of the back sheet portion 120 or the second section 134 of the front sheet portion 130 may be arranged to rest against the headrest or the car seat.

When the cover 100 is in use in the support position and resting on a support plane, the electronic device 110 may rest comfortably against the cover at an inclined angle with respect to the support plane. In this exemplary embodiment, a part of the side 112 of the electronic device 110 rests against the entire length C of the second section 134 of the front sheet portion 130. Depending on the dimensions of the electronic device 110, the entire side 112 may rest against the second section 134 of the front sheet portion 130, the electronic device 110 thus resting stably against the cover 100 in the support position. When the electronic device 110 comprises a flexible touchscreen display, the cover 100, when in use, may support the flexible touchscreen display when it is being touched, e.g. while typing, so that the flexible touchscreen display does not bend. The cover 100, when in use, may also support a flexible electronic device that is bent, as long as a part of the electronic device may rest against the cover. The cover may, for instance, be connected to an upper edge of the flexible electronic device with a magnetic attachment arrangement, the flexible electronic device being bent while resting against the cover. In an embodiment, depending on the dimensions of the electronic device 110, only a part of the side 112 of the electronic device 110 may rest against the second section 134 of the front sheet portion 130. In this exemplary embodiment, the first end 121 of the back sheet portion 120 does not extend beyond the second section 134 of the front sheet portion 130 and thus does not make contact with the side 112 of the electronic device 110 when in use in the support position. The side 112 of the electronic device 110 thus does not rest against the first end 121 of the back sheet portion 120 in the support position. However, in another embodiment, the first end 121 of the back sheet portion 120 may extend beyond the second section 134 of the front sheet portion 130 and thus may be in contact with the side 112 of the electronic device 110 when in use in the support position. In such an embodiment, the side 112 of the electronic device 110 may, when the cover 100 is in use in the support position, rest against at least a part of the second section 134 of the front sheet portion 130 and the first end 121 of the back sheet portion 120.

The length of the back sheet portion 120 from the first end 121 to the second end 122 along the back sheet portion 120 is denoted by L in the FIGs. L may be substantially equal or equal to the length of the electronic device 110 from the edge 111 to the opposite edge of the electronic device, but it may also be shorter or longer. The length of the first section 123 of the back sheet portion 120 in the direction of the length of the back sheet portion 120 from the first end 121 to the second end 122 is shown as B. In this embodiment, the length B is the length of the first section 123 of the back sheet portion 120 from the first end 121 to the hinge region 126 between the first 123 and second section 124 of the back sheet portion 120. The length of the second section 124 of the back sheet portion 120 in the direction of the length of the back sheet portion 120 from the first end 121 to the second end 122 is shown as A. In this embodiment, the length A is the length of the second section 124 of the back sheet portion 120 from the hinge region 126 to the second end 122. Lengths A and B may be substantially equal or equal. In an embodiment, A may be smaller or greater than B. In another embodiment, the length A may be greater or smaller than half the length L.

The length of the front sheet portion 130 along the front sheet portion from the first end 131 to the second end 132 may be shorter than the length L of the back sheet portion 120 from the first end 121 to the second end 122 along the back sheet portion. The length of the first section 133 of the front sheet portion 130 in the direction of the length of the front sheet portion 130 from the first end 131 to the second end 132 is shown as D. In this embodiment, the length D is the length of the first section 133 of the front sheet portion 130 from the first end 131 to the hinge region 135 between the first 133 and the second section 134 of the front sheet portion 130. The length of the second section 134 of the front sheet portion 130 in the direction of the length of the front sheet portion 130 from the first end 131 to the second end 132 is shown as C. In this embodiment, the length C is the length of the second section 134 of the front sheet portion 130 from the hinge region 135 to the second end 132. C may be greater than D. In another embodiment, C may be smaller than D, or C and D may be substantially equal or equal.

The dimensions of the cover 100 such as L, A, B, C and D and the width of the cover, wherein the width of the cover is the extent of the cover in the direction perpendicular to the length L, may vary greatly depending on e.g. the size and dimensions of the electronic device 110. The width of the cover 100 may be smaller than the width of the electronic device 110, i.e. the extent of the electronic device 110 in the direction of the width of the cover 100, when the cover is in use. A very narrow, strip-like cover may even be contemplated, for instance a cover having a width smaller than half the width of the electronic device. Such a narrow, strip-like cover may be stable in the support position, even if it may cover only a part of the electronic device or a part of a side of the electronic device. However, the width of the cover 100 may also be greater than the width of the device 110. Various dimensions, such as L, A, B, C or D, may be selected depending on factors such as the dimensions of the electronic device, the weight of the electronic device or the position of the center of mass of the electronic device. The dimensions, such as L, A, B, C or D, may be selected such that the cover 100 may be used in the cover position to cover at least a part of the electronic device 110, or at least a part of a side 112 or 113 of the electronic device. In an embodiment, the back sheet portion 120 has a length L sufficient to cover at least a part of both sides 112 and 113 or both sides 112 and 113 of the electronic device 110, for instance in embodiments in which the second section 134 of the front sheet portion 130 has a length substantially equal or equal to the length of one of the sides 112 and 113 from the edge 111 to the opposite edge of the electronic device. The back sheet portion 120 may thus be configured to cover at least a part of both sides 112 and 113 of the electronic device 110.

The thickness of the back sheet portion 120 and the front sheet portion 130 may depend on e.g. the dimensions of the electronic device 110, the weight of the electronic device, the position of the center of mass of the electronic device, and the material of the back sheet portion 120 and the front sheet portion 130.

The distance E and the length D of the first section 133 of the front sheet portion 130 in the direction of the length of the front sheet portion 130 from the first end 131 to the second end 132 may be substantially equal or equal. In an embodiment, E may be greater or smaller than D. The distance E may be at least 0.1 of the length B of the first section 123 of the back sheet portion 120 in the direction of the length of the back sheet portion from the first end 121 to the second end 122. In an embodiment, the distance E is less than 0.5 of the length B. In other embodiments, the distance E is 0.1 to 0.9, 0.3 to 0.7, or 0.1 to 0.5 of the length B of the first section 123 of the back sheet portion 120 in the direction of the length of the back sheet portion from the first end 121 to the second end 122.

In this embodiment, A and C are substantially equally long, such that in the cover position, the hinge regions 126 and 135 may be superimposed. In embodiments in which the hinge regions 126 and 135 may be superimposed when the back sheet portion 120 and the front sheet portion 130 rest against each other in the cover position, the cover 100 may be folded hingedly about both hinge regions 126 and 135 into a secondary support position so that the cover 100 is L-shaped when viewed from the side (not shown). In such a secondary support position, the first end 121 of the back sheet portion may form a contact with the side 112 of the electronic device 110 so that the electronic device 110 may be arranged to rest against the cover 100. The first end 121 of the back sheet portion may also be configured to rest against a support plane, such as a table top, in such a secondary support position.

In the support position, the second section 124 of the back sheet portion 120 and the second section 134 of the front sheet portion 130 lie at an angle α to each other. The first section 123 of the back sheet portion 120 and the second section 124 of the back sheet portion 120 lie at an angle β to each other. The angle β may be between 0° to 180°. In an embodiment, the angle β is in the range of 10° to 125°. In a further embodiment, the angle β is in the range of 10° to 125°, and the distance E is substantially equal or equal to the length D of the first section 133 of the front sheet portion 130. An angle β in the range of 25° to 125° may however provide a stable cover in the support position. The angle α may be between 0° and 80°. An angle α in the range of 25° to 75° may however provide a comfortable angle for the electronic device 110 in the support position. In an embodiment, the angle α is in the range of 25° to 75°, and the distance E is substantially equal or equal to the length D of the first section 133 of the front sheet portion 130.

The cover may be scalable for various different electronic devices having different dimensions. The cover may also be stable.

The attachment 150 of the attaching arrangement may be located in the first section 133 of the front sheet portion 130 and the attachment 151 in the end section 125 so that when the cover 100 is folded in the support position, the attachments 150 and 151 are substantially aligned with each other and may thus exert a force on each other, so that they are configured to retain at least a part of the end section 125 against at least a part of the first section 133 of the front sheet portion 130 when in the support position. In an embodiment, at least a part of the end section 125 is configured to be retained against at least a part of the first section 133 of the front sheet portion 130 by friction between the at least a part of the end section 125 and the at least a part of the first section 133 of the front sheet portion in the support position when in use.

In the device assembly 170, the side 112 of the body of the electronic device 110 facing the attachment 160 (not visible in FIG. 1C) may be made of or comprise a ferromagnetic metal, such that when the attachment 160 comprises a magnet, the magnet exerts a force on the side 112 of the electronic device and thus releasably retains the second section 134 of the front sheet portion 130 against the side 112 in the support position when in use. The device assembly may also be implemented so that there is another attachment disposed to the side 112 of the electronic device that is substantially aligned with the attachment 160 in the second section 134 of the front sheet portion 130 in the support position. When in use, the attachments may exert a force on each other and thus the attachment arrangement may be configured to releasably retain the second section 134 of the front sheet portion 130 against the side 112 in the support position when in use.

The cover 100 may comprise one or more electronic components or connectors for forming a signal or an electric connection from the electronic device to the cover or to other devices, such as a Near Field Communication (NFC) connector or a Wireless Charging (WNC) component. In an embodiment, the cover 100 may comprise e.g. a keyboard or a battery integrated into the cover in one or more of the sections of the sheet portions.

Figure 2A:
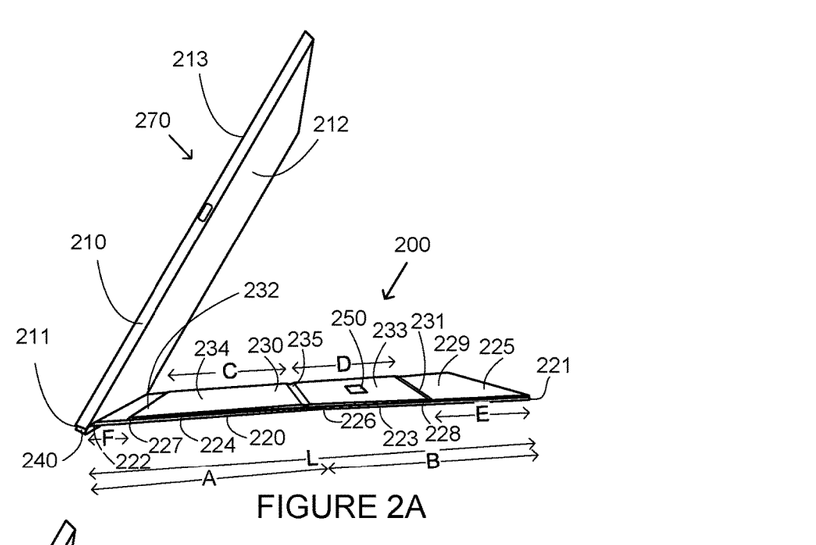
FIGS. 2A, 2B and 2C illustrate alternative views and details of another embodiment of a cover for an electronic device and a device assembly.
Figures 2B, 2C:
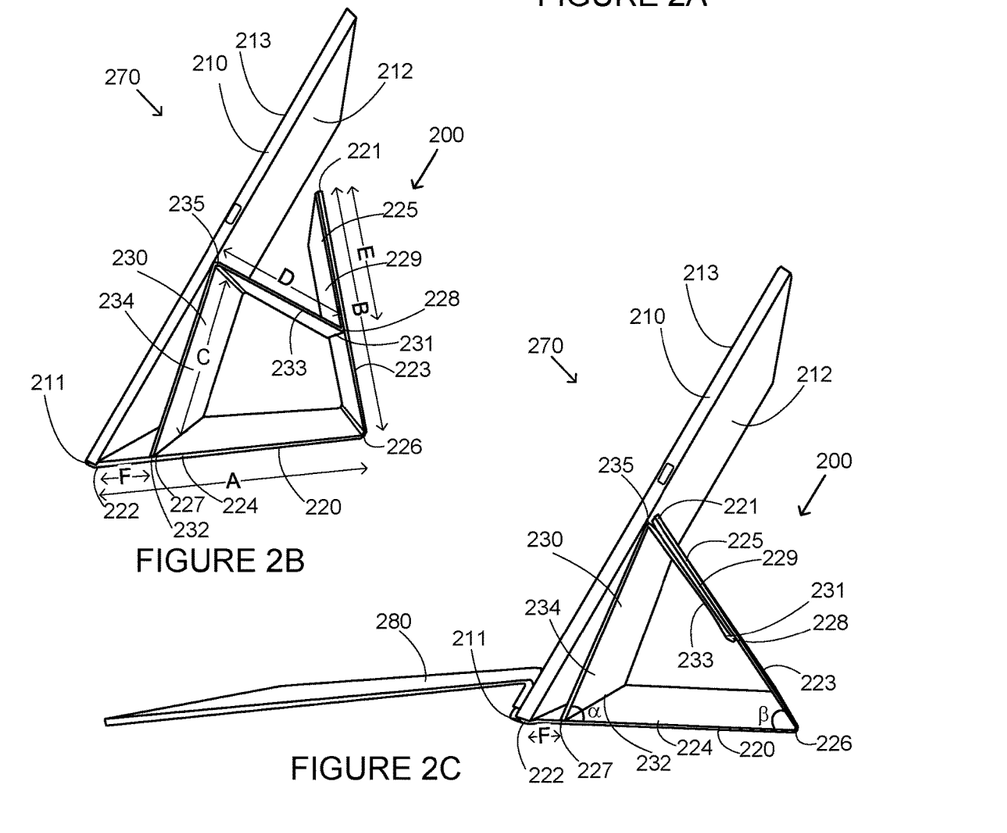

The exemplary embodiment of the cover 200 shown in FIGS. 2A to 2C differs from that of FIGS. 1A to 1C in that the second end 232 of the front sheet portion 230 is pivotally or hingedly connected to the second section 224 of the back sheet portion 220 at a distance F from the second end 222 of the back sheet portion 220. The distance F from the second end 222 of the back sheet portion 220 may be 0.01 to 0.9 or 0.01 to 0.5 of the length A of the second section 224 of the back sheet portion 220 in the direction of the length of the back sheet portion 220 from the first end 221 to the second end 222. The distance F may however selected depending on angles α and β and the lengths E and D. In this exemplary embodiment, the side 212 of the electronic device 210 may rest against the hinge region 235 of the front sheet portion 230 when the cover 200 is in the support position. The side 212 of the electronic device 210 may rest against the end 221 of the back sheet portion 220. Other aspects of the embodiment shown in FIGS. 2A to 2C are generally similar to those of the embodiment shown in FIGS. 1A to 1C.

In the embodiment shown in FIGS. 2A to 2C, the length C of the second section 234 of the front sheet portion 230 in the direction of the length of the front sheet portion 230 from the first end 231 to the second end 232 is smaller than the length A of the second section 224 of the back sheet portion 220 in the direction of the length of the back sheet portion from the first end 221 to the second end 222. Further, the hinge regions 226 and 235 are disposed so that in the cover position, the hinge regions 226 and 235 are not superimposed.

The exemplary embodiment of the cover 200 shown in FIGS. 2A to 2C differs from that of FIGS. 1A to 1C also in that the cover comprises an attachment end section 229 extending from the first end 231 of the front sheet portion 230. The attachment end section 229 is hingedly connected to the first end 231 of the front sheet portion 230. At least a part of the attachment end section 229 is connected to the first section 223 of the back sheet portion 220 so that the first end 231 of the front sheet portion 230 is pivotally or hingedly connected via the attachment end section 229 to the first section 223 of the back sheet portion 220 at the distance E from the first end 221 of the back sheet portion 220. The end section 225 may thus be considered to comprise a part of the first section 223 of the back sheet portion 220 and at least a part of the attachment end section 229. When in use in the support position, the attachment end section 229 rests on or against at least a part of the first section 233 of the front sheet portion 230.

The attachment end section 229 and the front sheet portion 230 may be integral parts of the cover 220 formed as one single body e.g. by folding a single sheet into two or more sections, or they may be connected via a suitable hinge or hinge region.

The attachment end section 229 may be irremovably connected to the first section 223 of the back sheet portion 220 using an adhesive or a mechanical attaching structure or by laminating the attachment end section 229 to the first section 223 of the back sheet portion 220. In another embodiment, the attachment end section 229 may be releasably connected or connectable to the first section 223 the back sheet portion 220 using a suitable attaching arrangement or attachment, such as a magnet, an adhesive or any other type of attachment described in this specification. In embodiments in which the attachment end section 229 is releasably connected, it may be possible to adjust the distance E at which the first end 231 of the front sheet portion 230 may be pivotally or hingedly connected via the attachment end section 229 to the first section 223 of the back sheet portion 220 at the distance E from the first end 221 of the back sheet portion 220. Therefore it may be possible to adjust the angle α between the second section 234 of the front sheet portion 230 and the second section 224 of the back sheet portion 220 in the support position to allow for adjusting the position of the electronic device 210 that may be disposed to rest against the cover 200.

The device assembly 270 shown in FIG. 2C further comprises an auxiliary cover 280. The auxiliary cover 280 may be releasably or irremovably attached or attachable to the electronic device 210, for instance in a manner similar to that of the cover 200. In an embodiment, the auxiliary cover may be releasably or irremovably attached or attachable to the cover 200. While the cover 200 may be turnable to cover the side 212 of the electronic device, the auxiliary cover 280 may be turnable to cover the opposite side 213 of the electronic device.

Figures 3A, 3B:
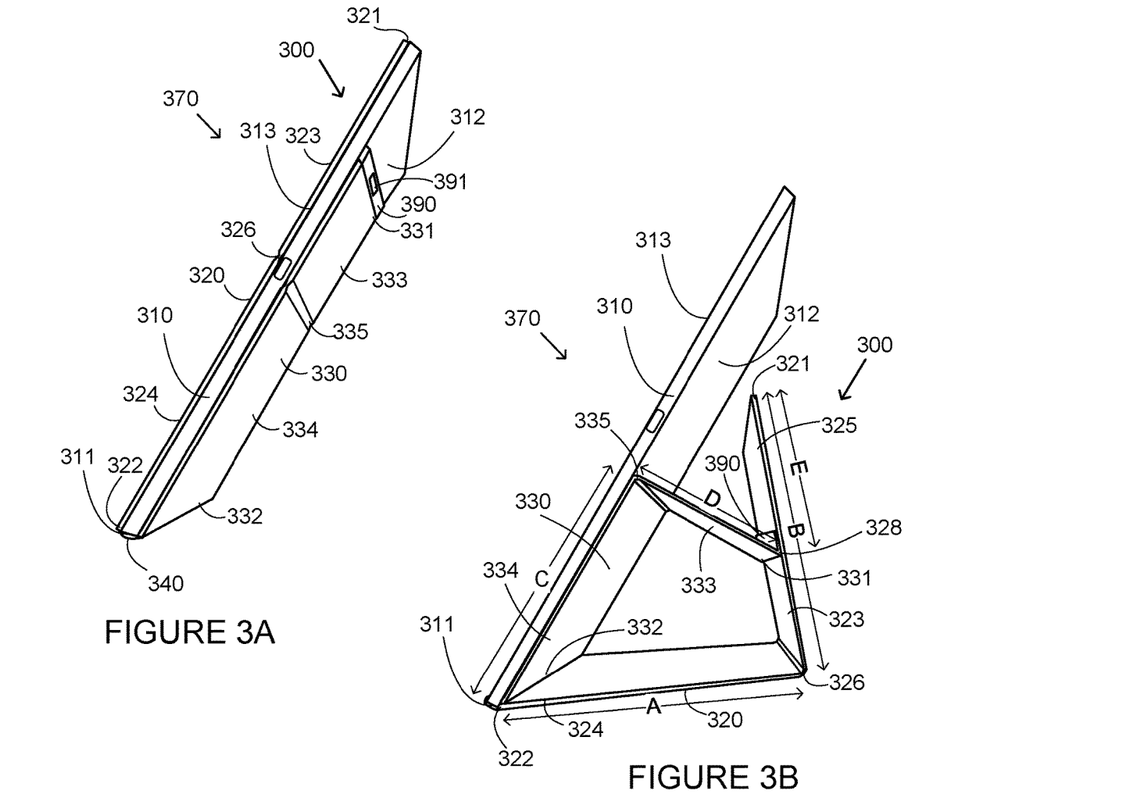
FIGS. 3A, 3B and 3C illustrate alternative views and details of another embodiment of a cover for an electronic device and a device assembly.
Figure 3C:
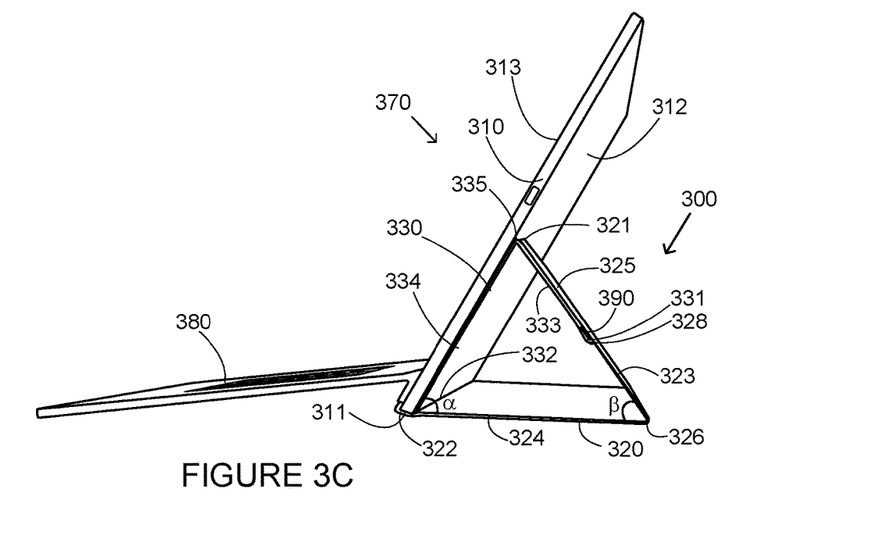

The exemplary embodiment of the cover 300 shown in FIGS. 3A to 3C differs from that of FIGS. 1A to 1C and 2A to 2C in that when in use in the cover position shown in FIG. 3A, the back sheet portion 320 and the front sheet portion 330 may be arranged against the opposite sides 312 and 313 of the electronic device 310. In other embodiments, it may however be possible to arrange the cover 300 so that the back sheet portion 320 and the front sheet portion 330 are substantially planar, parallel and resting against each other, for instance by turning the back sheet portion 320 pivotally or hingedly about the edge 311 of the electronic device. In this embodiment, the second end 322 of the back sheet portion 320 and the second end 332 of the front sheet portion 330 are connected or connectable to each other via a connecting member 340. They may be pivotally or hingedly connectable or connected. In another embodiment, the second end 322 of the back sheet portion 320 and the second end 332 of the front sheet portion 330 may be connected or connectable to opposite sides 313 and 312 of the electronic device 310, respectively, or to the edge 311 of the electronic device, via separate connecting members. The connecting member(s) may be any connecting member described in this specification. The connecting member 340 is not necessarily attached to the electronic device 310. However, it may be releasably attached to the electronic device 310. The electronic device 310 may thus be separated from the cover 300 and placed back inside the cover 300. Other aspects of the embodiment shown in FIGS. 3A to 3C are generally similar to those of the embodiments shown in FIGS. 1A to 1C and 2A to 2C.

The second section 334 of the front sheet portion 330 may be attachable or attached substantially along its entire length C to the side 312 of the electronic device 310, for instance using a suitable attaching arrangement or attachment, including any attaching arrangement or attachment described in this specification. In this exemplary embodiment, the second section 334 of the front sheet portion 330 is irremovably attached to the side 312 of the electronic device 310.

In this embodiment, the length of the front sheet portion 330 in the direction of the length of the front sheet portion 330 from the first end 331 to the second end 332 may be smaller than the length L of the back sheet portion 320 in the direction of the length of the back sheet portion 320 from the first end 321 to the second end 322. The front sheet portion 330 may thus cover only a part of the side 312 of the electronic device 310. The back sheet portion 320 may cover a part of or the entire opposite side 313 of the electronic device 310.

In this embodiment, the cover 300 comprises an attachment end section 390 extending from the first end 331 of the front sheet portion 330. The attachment end section 390 is hingedly connected to the first end 231 of the front sheet portion 330 via a hinge region 328. At least a part of the attachment end section 390 is connectable to the first section 323 of the back sheet portion 320 so that when in use in an open position or in the support position, as shown in FIGS. 3B and 3C, the first end 331 of the front sheet portion 330 is may be pivotally or hingedly connected via the attachment end section 390 to the first section 331 of the back sheet portion 330 at the distance E from the first end 321 of the back sheet portion 320. The attachment end section 390 may comprise an attaching arrangement comprising an attachment 391 configured to releasably attach the attachment end section 390 to the first section 323 of the back sheet portion 320. The attaching arrangement and the attachment 391 may be any attaching arrangement or attachment described in this specification. It may thus be possible to adjust the distance E at which the first end 331 of the front sheet portion 330 may be pivotally or hingedly connected via the attachment end section 390 to the first section 323 of the back sheet portion 320 at the distance E from the first end 321 of the back sheet portion 320. Therefore it may be possible to adjust the angle α between the second section 334 of the front sheet portion 330 and the second section 324 of the back sheet portion 320 in the support position to allow for adjusting the position of the electronic device 310 that may be disposed to rest against the cover 300.

The attachment end section 390 and the front sheet portion 230 may be integral parts of the cover formed as one single body e.g. by folding a single sheet into two or more sections, or they may be connected e.g. via a suitable hinge or hinge region. The end section 325 may thus be considered to comprise a part of the first section 323 of the back sheet portion 320 and at least a part of the attachment end section 390. When in use in the support position, the attachment end section 390 rests on or against at least a part of the first section 333 of the front sheet portion 330.

The device assembly 370 shown in FIG. 3C further comprises a removable keyboard 380. The removable keyboard 380 may be releasably attached to the electronic device 310, for instance in a manner similar to that of the cover 300. In an embodiment, the removable keyboard 380 may be connected or connectable to the cover 300. If the removable keyboard 380 is pivotally turnable to rest against the side 313 of the electronic device 310, the back sheet portion 320 may be turnable to cover the removable keyboard 380 resting against the side 313 of the electronic device 310.

Figures 4A, 4B:
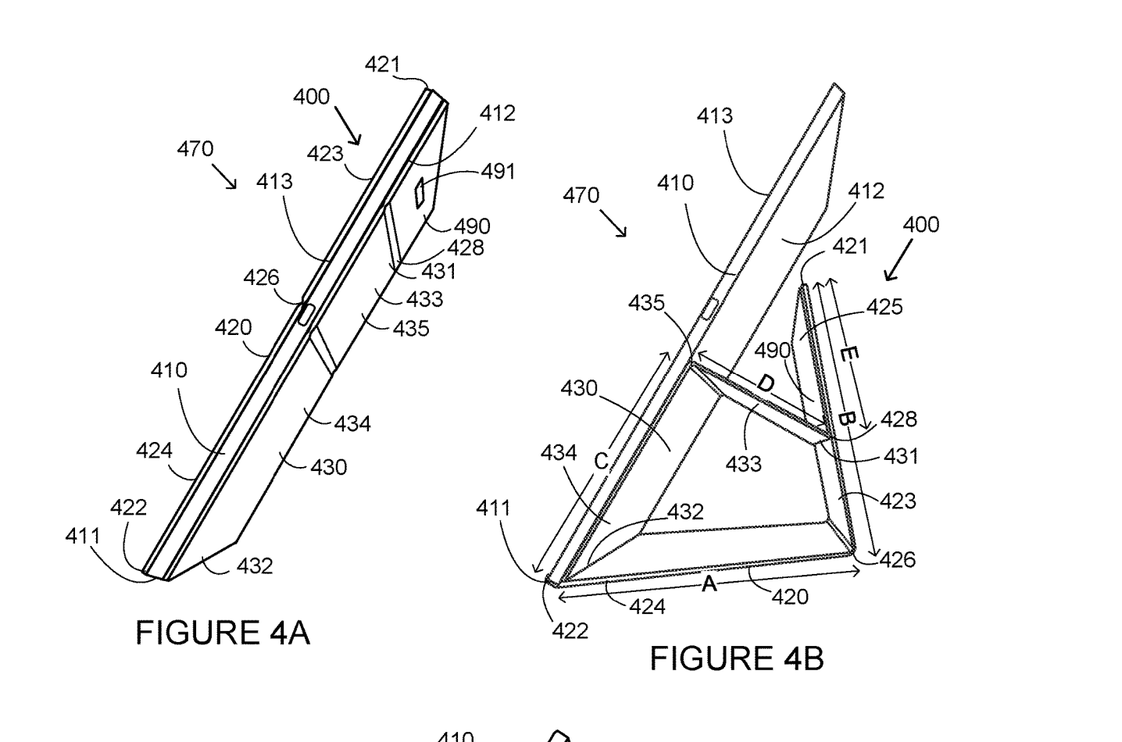
FIGS. 4A, 4B and 4C illustrate alternative views and details of another embodiment of a cover for an electronic device and a device assembly.
Figure 4C:
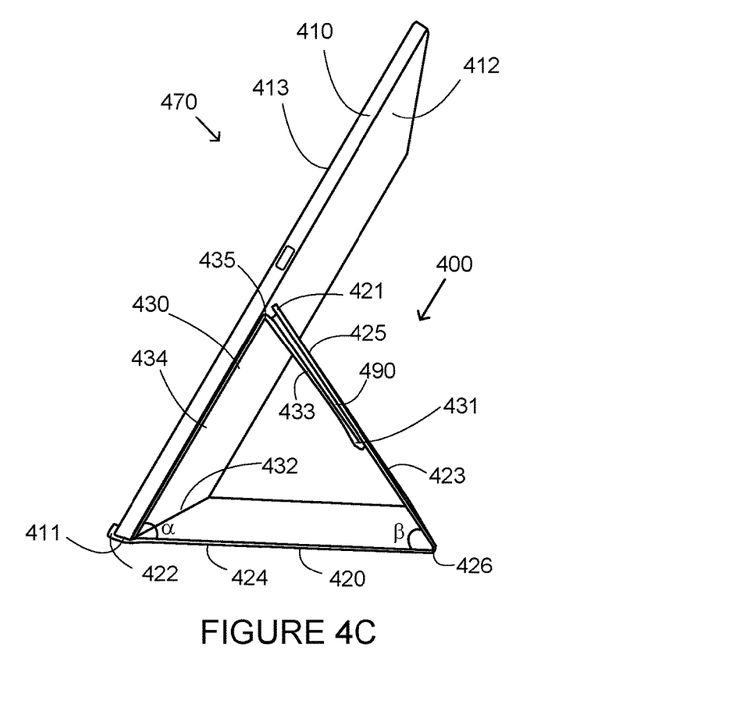

The exemplary embodiment of the cover 400 shown in FIGS. 4A to 4C differs from that of FIGS. 3A to 3C in that the length of the attachment end section 490 in the direction of the length of the front sheet portion 430 from the first end 431 to the second end 432 is substantially equal or slightly shorter than the distance E. In this embodiment, the length of the attachment end section 490 is substantially equal to the distance between the first end 421 of the back sheet portion 420 and the first end 431 of the front sheet portion 430 when the attachment end section 490 is, in use, attached to the first section 423 of the back sheet portion 420. The combined length of the front sheet portion 430 and the attachment end section 490 extending from the first end 431 of the front sheet portion 430 in the direction of the length of the front sheet portion 430 from the first end 431 to the second end 432 is substantially equal to the length of the back sheet portion 420 in the direction of the length of the back sheet portion 420 from the first end 421 to the second end 422. The cover 400 may thus in use cover the entire opposite sides 412 and 413 of the electronic device 410. The second end 432 of the front sheet portion 430 is connected or connectable to the second end 422 of the back sheet portion 420 via the electronic device 410. Other aspects of the embodiment shown in FIGS. 4A to 4C are generally similar to those of the embodiment shown in FIGS. 3A to 3C.

The attachment end section 490 may comprise an attaching arrangement comprising an attachment 491 configured to releasably attach the attachment end section 490 to the first section 423 of the back sheet portion. The attachment arrangement and the attachment 491 may be any attaching arrangement or attachment described in this specification.

In the embodiment of FIGS. 4A to 4C, the back sheet portion is turnable about the edge 411 of the electronic device 410. The second section 434 of the front sheet portion may be irremovably or releasably attached to the side 412 of the electronic device 410.

Some embodiments are further discussed shortly in the following.

In a first aspect, a cover for an electronic device may comprise a back sheet portion having a first end and a second end, the back sheet portion comprising a first section extending from the first end and a second section, the first section of the back sheet portion being hingedly connected to the second section of the back sheet portion, and a front sheet portion having a first end and a second end, the front sheet portion comprising a first section extending from the first end and a second section, the first section of the front sheet portion being hingedly connected to the second section of the front sheet portion; wherein the second end of the front sheet portion is connectable or hingedly connected to the second section of the back sheet portion, and the first end of the front sheet portion is hingedly connectable or connected to the first section of the back sheet portion at a distance of the first end of the back sheet portion, the cover thereby having an end section extending the distance from the first end of the back sheet portion along the first section of the back sheet portion; the cover being foldable between a cover position and a support position, wherein in the cover position, the back sheet portion and the front sheet portion are substantially planar and parallel to and/or resting against each other, and in the support position, at least a part of the end section rests against at least a part of the first section of the front sheet portion.

The back sheet portion and the front sheet portion may be parallel to each other, or resting against each other, or parallel to each other and resting against each other in the cover position.

In an embodiment which may be in accordance with the preceding embodiment, the electronic device has an edge, and the cover is pivotally connectable to the edge of the electronic device.

In an embodiment which may be in accordance with any of the preceding embodiments, the electronic device has an edge, and the cover comprises a connecting member configured to connect the cover pivotally to the edge of the electronic device.

In an embodiment which may be in accordance with any of the preceding embodiments, the second end of the front sheet portion is pivotally or hingedly connectable to the second section of the back sheet portion.

In an embodiment which may be in accordance with any of the preceding embodiments, the cover is foldable between the cover position, the support position and an open position, wherein in the open position, at least a part of the first and second section of the back sheet portion and at least a part of the first and second section of the front sheet portion form a hollow structure having a quadrilateral cross-section. In such an embodiment, the back sheet portion and the front sheet portion are at least partially separated by a distance so that they form the hollow structure having a quadrilateral cross-section.

In an embodiment which may in accordance with any of the preceding embodiments, the distance E is substantially equal or equal to the length D of the first section of the front sheet portion.

In an embodiment which may be in accordance with any of the preceding embodiments, in the support position, the first section of the back sheet portion and the second section of the back sheet portion lie at an angle in the range of 25° to 125° to each other. In a further embodiment which may be in accordance with any of the preceding embodiments, in the support position, the first section of the back sheet portion and the second section of the back sheet portion lie at an angle in the range of 25° to 125°, and the distance E is substantially equal or equal to the length D of the first section of the front sheet portion.

In an embodiment which may in accordance with any of the preceding embodiments, in the support position, the second section of the front sheet portion and the second section of the back sheet portion lie at an angle in the range of 25° to 75° to each other. In a further embodiment which may be in accordance with any of the preceding embodiments, in the support position, the second section of the front sheet portion and the second section of the back sheet portion lie at an angle in the range of 25° to 75° to each other, and the distance E is substantially equal or equal to the length D of the first section of the front sheet portion.

In an embodiment which may be in accordance with any of the preceding embodiments, the cover comprises an attaching arrangement configured to retain the at least a part of the end section resting against the at least a part of the first section of the front sheet portion.

The attaching arrangement may comprise a magnet, a mechanical stopper, an adhesive, a touch fastener, or a press fastener.

In an embodiment which may be in accordance with any of the preceding embodiments, the cover comprises a magnetic attaching arrangement configured to retain the at least a part of the end section resting against the at least a part of the first section of the front sheet portion.

In an embodiment which may be in accordance with any of the preceding embodiments, the second end of the front sheet portion is connectable or connected to the second section of the back sheet portion at a distance of the second end of the back sheet portion.

In an embodiment which may be in accordance with any of the preceding embodiments, the second end of the front sheet portion is connectable or connected to the second end of the back sheet portion.

In an embodiment which may be in accordance with any of the preceding embodiments, the cover is foldable between the cover position and the support position with the first section of the front sheet portion being hingedly connected to the first section of the back sheet portion at the distance of the first end of the back sheet portion.

In an embodiment which may be in accordance with any of the preceding embodiments, the electronic device has a first side and a second side opposite to the first side, the front sheet portion is pivotally turnable to cover at least a part of the first side of the electronic device, and the back sheet portion is pivotally turnable to cover at least a part of the opposite side of the electronic device.

In an embodiment which may be in accordance with any of the preceding embodiments, in the cover position, the front sheet portion rests against the back sheet portion.

In an embodiment which may be in accordance with any of the preceding embodiments, the electronic device has an edge, and the cover comprises a connecting member configured to connect the cover to the edge of the electronic device.

In an embodiment which may be in accordance with any of the preceding embodiments, the electronic device has a side, and the cover comprises an attaching arrangement configured to retain at least a part of the second section of the front sheet portion against the side of the electronic device.

In an embodiment which may be in accordance with any of the preceding embodiments, the cover comprises an attaching arrangement configured to retain at least a part of the first section of the front sheet portion against a side of the electronic device.

In a second aspect, a cover for an electronic device may comprise a back sheet portion and a front sheet portion connected or connectable to each other; the cover being foldable between a cover position, a support position and an open position; wherein in the cover position, the back sheet portion and the front sheet portion are substantially planar and parallel to each other and/or resting against each other; in the support position, the back sheet portion and the front sheet portion are at least partially separated by a distance so that they form a hollow structure having a triangular cross-section; and in the open position, the back sheet portion and the front sheet portion are at least partially separated by a distance so that they form a hollow structure having a quadrilateral cross-section. The back sheet portion and the front sheet portion may be pivotally or hingedly connected or connectable to each other.

In an embodiment which may be in accordance with the preceding embodiment, the front sheet portion has a first end and a second end, the first end and second end of the front sheet portion being hingedly connected or connectable to the back sheet portion; wherein the cover is foldable between the cover position, the support position and the open position with the first end and second end of the front sheet portion being hingedly connected to the back sheet portion.

In an embodiment which may be in accordance with any of the preceding embodiments, the electronic device has an edge, and the cover is pivotally connectable to the edge of the electronic device.

In an embodiment which may be in accordance with any of the preceding embodiments, the electronic device has an edge, and the cover comprises a connecting member configured to connect the cover pivotally to the edge of the electronic device.

In an embodiment which may be in accordance with any of the preceding embodiments, the electronic device has a first side and a second side opposite to the first side, the front sheet portion is pivotally turnable to cover at least a part of the first side of the electronic device, and the back sheet portion is pivotally turnable to cover at least a part of the opposite side of the electronic device.

In an embodiment which may be in accordance with any of the preceding embodiments, in the cover position, the front sheet portion rests against the back sheet portion.

In an embodiment which may be in accordance with any of the preceding embodiments, the electronic device has an edge, and the cover comprises a connecting member configured to connect the cover to the edge of the electronic device.

In an embodiment which may be in accordance with any of the preceding embodiments, the electronic device has a side, and the cover comprises an attaching arrangement configured to retain at least a part of the cover against the side of the electronic device.

In an embodiment which may be in accordance with any of the preceding embodiments, the electronic device has a side, and the cover comprises an attaching arrangement configured to retain at least a part of the front sheet portion against the side of the electronic device.

In a third aspect, a device assembly may comprise: an electronic device having an edge; and a cover, the cover comprising a back sheet portion having a first end and a second end, the back sheet portion comprising a first section extending from the first end and a second section, the first section of the back sheet portion being hingedly connected or connectable to the second section of the back sheet portion, and a front sheet portion having a first end and a second end, the front sheet portion comprising a first section extending from the first end and a second section, the first section of the front sheet portion being hingedly connected to the second section of the front sheet portion; wherein the second end of the front sheet portion is connectable or connected to the second section of the back sheet portion, and the first end of the front sheet portion is hingedly connectable or hingedly connected to the first section of the back sheet portion at a distance of the first end of the back sheet portion, the cover thereby having an end section extending the distance from the first end of the back sheet portion along the first section of the back sheet portion; wherein the cover is connected to the edge of the electronic device, the cover being foldable between a cover position and a support position, wherein in the cover position, the back sheet portion and the front sheet portion are substantially planar and parallel to and/or resting against each other, and in the support position, at least a part of the end section rests against at least a part of the first section of the front sheet portion. The cover may be in accordance with any of the covers of the first or second aspect discussed above.

The cover may be pivotally connected to the edge of the electronic device.

In an embodiment which may be in accordance with the preceding embodiment, the cover is foldable between the cover position and the support position with the first section of the front sheet portion being hingedly connected to the first section of the back sheet portion at a distance of the first end of the back sheet portion.

In an embodiment which may be in accordance with any of the preceding embodiments, the cover comprises an attaching arrangement configured to retain at least a part of the first section of the front sheet portion against a side of the electronic device.

The attaching arrangement may comprise a magnet, a mechanical stopper, an adhesive, a touch fastener, or a press fastener.

In an embodiment which may be in accordance with any of the preceding embodiments, the electronic device has a side, and the cover comprises an attaching arrangement configured to retain at least a part of the second section of the front sheet portion against the side of the electronic device.

In an embodiment which may be in accordance with any of the preceding embodiments, the electronic device has a side, and the cover comprises a magnetic attaching arrangement configured to retain at least a part of the second section of the front sheet portion against the side of the electronic device.

In an embodiment which may be in accordance with any of the preceding embodiments, the electronic device has a first side and a second side opposite to the first side; the back sheet portion is pivotally turnable to cover at least a part of the first side of the electronic device, and the front sheet portion is pivotally turnable to cover at least a part of the second side of the electronic device.

In an embodiment which may be in accordance with any of the preceding embodiments, the device assembly further comprises an auxiliary cover, a removable keyboard or both.

In a fourth aspect, a device assembly may comprise: an electronic device having an edge; and a cover comprising a back sheet portion and a front sheet portion connected or connectable to each other; wherein the cover is connected to the edge of the electronic device, the cover being foldable between a cover position, a support position and an open position; wherein in the cover position, the back sheet portion and the front sheet portion are substantially planar and parallel to each other and/or resting against each other; in the support position, the back sheet portion and the front sheet portion are at least partially separated by a distance so that they form a hollow structure having a triangular cross-section; and in the open position, the back sheet portion and the front sheet portion are at least partially separated by a distance so that they form a hollow structure having a quadrilateral cross-section.

The back sheet portion and the front sheet portion may be pivotally or hingedly connected or connectable to each other. The cover may be pivotally connected to the edge of the electronic device.

In an embodiment which may be in accordance with any of the preceding embodiments, the front sheet portion has a first end and a second end, the first end and second end of the front sheet portion being hingedly connected or connectable to the back sheet portion; wherein the cover is foldable between the cover position, the support position and the open position with the first end and second end of the front sheet portion being hingedly connected to the back sheet portion.

In an embodiment which may be in accordance with any of the preceding embodiments, the cover comprises an attaching arrangement configured to retain at least a part of the cover against a side of the electronic device.

In an embodiment which may be in accordance with any of the preceding embodiments, the cover comprises an attaching arrangement configured to retain at least a part of the front sheet portion against a side of the electronic device.

The attaching arrangement may comprise a magnet, a mechanical stopper, an adhesive, a touch fastener, or a press fastener.

In an embodiment which may be in accordance with any of the preceding embodiments, the electronic device has a side, and the cover comprises a magnetic attaching arrangement configured to retain at least a part of the front sheet portion against the side of the electronic device.

In an embodiment which may be in accordance with any of the preceding embodiments, the electronic device has a first side and a second side opposite to the first side; the back sheet portion is pivotally turnable to cover at least a part of the first side of the electronic device, and the front sheet portion is pivotally turnable to cover at least a part of the second side of the electronic device.

In an embodiment which may be in accordance with any of the preceding embodiments, the device assembly further comprises an auxiliary cover, a removable keyboard or both.

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in lap upper computers, tablet computers, game consoles or game controllers, various wearable devices, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The invention claimed is:

1. A cover for an electronic device, comprising
a back sheet portion having a first end and a second end, the back sheet portion comprising a first section extending from the first end and a second section, the first section of the back sheet portion being hingedly connected to the second section of the back sheet portion, and
a front sheet portion having a first end and a second end, the front sheet portion comprising a first section extending from the first end and a second section, the first section of the front sheet portion being hingedly connected to the second section of the front sheet portion; wherein
the second end of the front sheet portion is hingedly connected to the second section of the back sheet portion, and
the first end of the front sheet portion is hingedly connected to the first section of the back sheet portion at a distance of the first end of the back sheet portion, the cover thereby having an end section extending the distance from the first end of the back sheet portion along the first section of the back sheet portion;
the cover being foldable between a cover position and a support position, wherein
in the cover position, the back sheet portion and the front sheet portion are substantially planar and resting against each other, and
in the support position, at least a part of the end section folding back onto and resting against at least a part of the first section of the front sheet portion.

2. A cover as defined in claim 1, wherein the electronic device has an edge, and the cover is pivotally connectable to the edge of the electronic device.

3. A cover as defined in claim 1, wherein the electronic device has an edge, and the cover comprises a connecting member configured to connect the cover pivotally to the edge of the electronic device.

4. A cover as defined in claim 1, wherein in the support position, the first section of the back sheet portion and the second section of the back sheet portion lie at an angle in the range of 25° to 125° to each other.

5. A cover as defined in claim 1, wherein in the support position, the second section of the front sheet portion and the second section of the back sheet portion lie at an angle in the range of 25° to 75° to each other.

6. A cover as defined in claim 1, wherein the cover comprises an attaching arrangement configured to retain the at least a part of the end section resting against the at least a part of the first section of the front sheet portion.

7. A cover as defined in claim 1, wherein the second end of the front sheet portion is connected to the second end of the back sheet portion and the first end of the front sheet portion is hingedly connected to the first section of the back sheet portion at about one half of a length of the first section of the back sheet portion.

8. A cover as defined in claim 1, wherein the electronic device has a side, and the cover comprises an attaching arrangement configured to retain at least a part of the second section of the front sheet portion against the side of the electronic device.

9. A cover for an electronic device, comprising:
a back sheet portion having a first end and a second end, the back sheet portion comprising a first section extending from the first end and a second section, the first section of the back sheet portion being hingedly connected to the second section of the back sheet portion, and
a front sheet portion having a first end and a second end, the front sheet portion comprising a first section extending from the first end and a second section, the first section of the front sheet portion being hingedly connected to the second section of the front sheet portion; wherein
the second end of the front sheet portion is connectable to the second section of the back sheet portion, and
the first end of the front sheet portion is hingedly connectable to the first section of the back sheet portion at a distance of the first end of the back sheet portion, the cover thereby having an end section extending the distance from the first end of the back sheet portion along the first section of the back sheet portion;
the cover being foldable between a cover position and a support position; wherein
in the cover position, the back sheet portion and the front sheet portion are substantially planar and parallel to each other, and
in the support position, at least a part of the end section folding back onto and resting against at least a part of the first section of the front sheet portion.

10. A cover as defined in claim 9, wherein the cover is foldable between the cover position and the support position with the first section of the front sheet portion being hingedly connected to the first section of the back sheet portion at the distance of the first end of the back sheet portion.

11. A cover as defined in claim 9, wherein the electronic device has an edge, and the cover is pivotally connectable to the edge of the electronic device.

12. A cover as defined in claim 9, wherein the electronic device has a first side and a second side opposite to the first side; the front sheet portion is pivotally turnable to cover at least a part of the first side of the electronic device, and the back sheet portion is pivotally turnable to cover at least a part of the second side of the electronic device.

13. A cover as defined in claim 9, wherein in the cover position, the front sheet portion rests against the back sheet portion.

14. A cover as defined in claim 9, wherein the electronic device has an edge, and the cover comprises a connecting member configured to connect the cover to the edge of the electronic device.

15. A cover as defined in claim 9, wherein in the support position, the first section of the back sheet portion and the second section of the back sheet portion lie at an angle in the range of 10° to 125°.

16. A cover as defined in claim 9, wherein in the support position, the second section of the front sheet portion and the second section of the back sheet portion lie at an angle in the range 25° to 75° to each other.

17. A cover as defined in claim 9, wherein the second end of the front sheet portion is connectable to the second end of the back sheet portion.

18. A cover as defined in claim 9, wherein the cover comprises a magnetic attaching arrangement configured to retain the at least a part of the end section resting against the at least a part of the first section of the front sheet portion.

19. A cover for an electronic device, comprising:
 a back sheet portion and a front sheet portion connected or connectable to each other, each of the back sheet portion and the front sheet portion having only two sections, the only two sections of the back sheet portion foldable with respect to each other and the only two sections of the front sheet portion foldable with respect to each other;
 the cover being foldable between a cover position, a support position and an open position; wherein
 in the cover position, the back sheet portion and the front sheet portion are substantially planar and parallel to each other and/or resting against each other,
 in the support position, the back sheet portion and the front sheet portion are at least partially separated by a distance so that they form a hollow structure having a triangular cross-section, and
 in the open position, the back sheet portion and the front sheet portion are at least partially separated by a distance so that they form a hollow structure having a quadrilateral cross-section, two sides of the triangular cross-section and the quadrilateral cross-section defined by the only two sections of the back sheet portion.

20. A cover as defined in claim 19, wherein the front sheet portion has a first end and a second end, the first end and second end of the front sheet portion being hingedly connected or connectable to the back sheet portion; wherein the cover is foldable between the cover position, the support position and the open position with the first end and second end of the front sheet portion being hingedly connected to the back sheet portion.

* * * * *